Oct. 11, 1966   E. A. WAHL   3,277,732
ELECTRO-MECHANICAL GYRATOR
Filed Dec. 11, 1964   4 Sheets-Sheet 1

EUGENE A. WAHL
INVENTOR.

BY Rudolph J. Lucik
ATTORNEY

Oct. 11, 1966  E. A. WAHL  3,277,732
ELECTRO-MECHANICAL GYRATOR
Filed Dec. 11, 1964  4 Sheets-Sheet 2
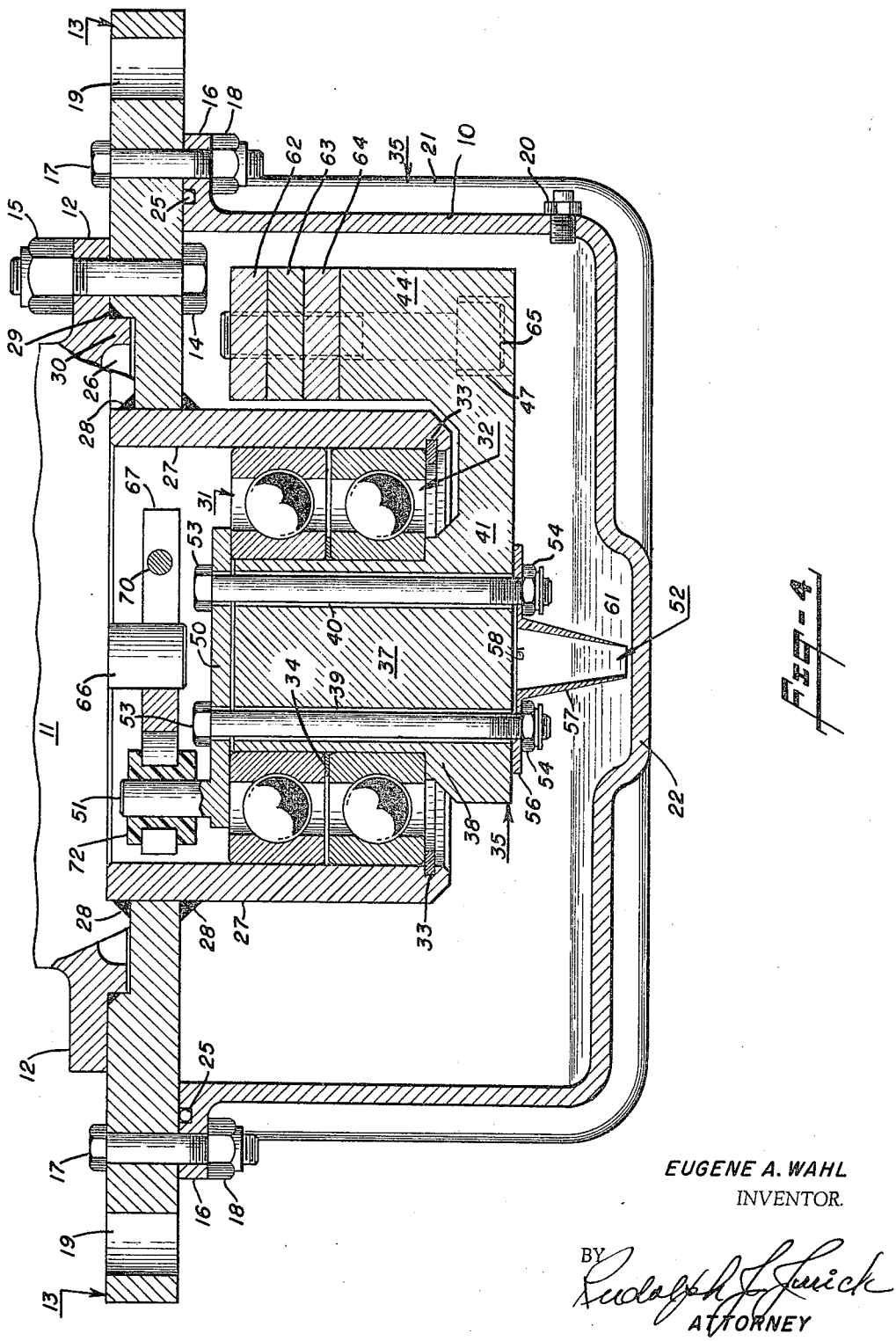
EUGENE A. WAHL
INVENTOR.
BY Rudolph J. Smick
ATTORNEY

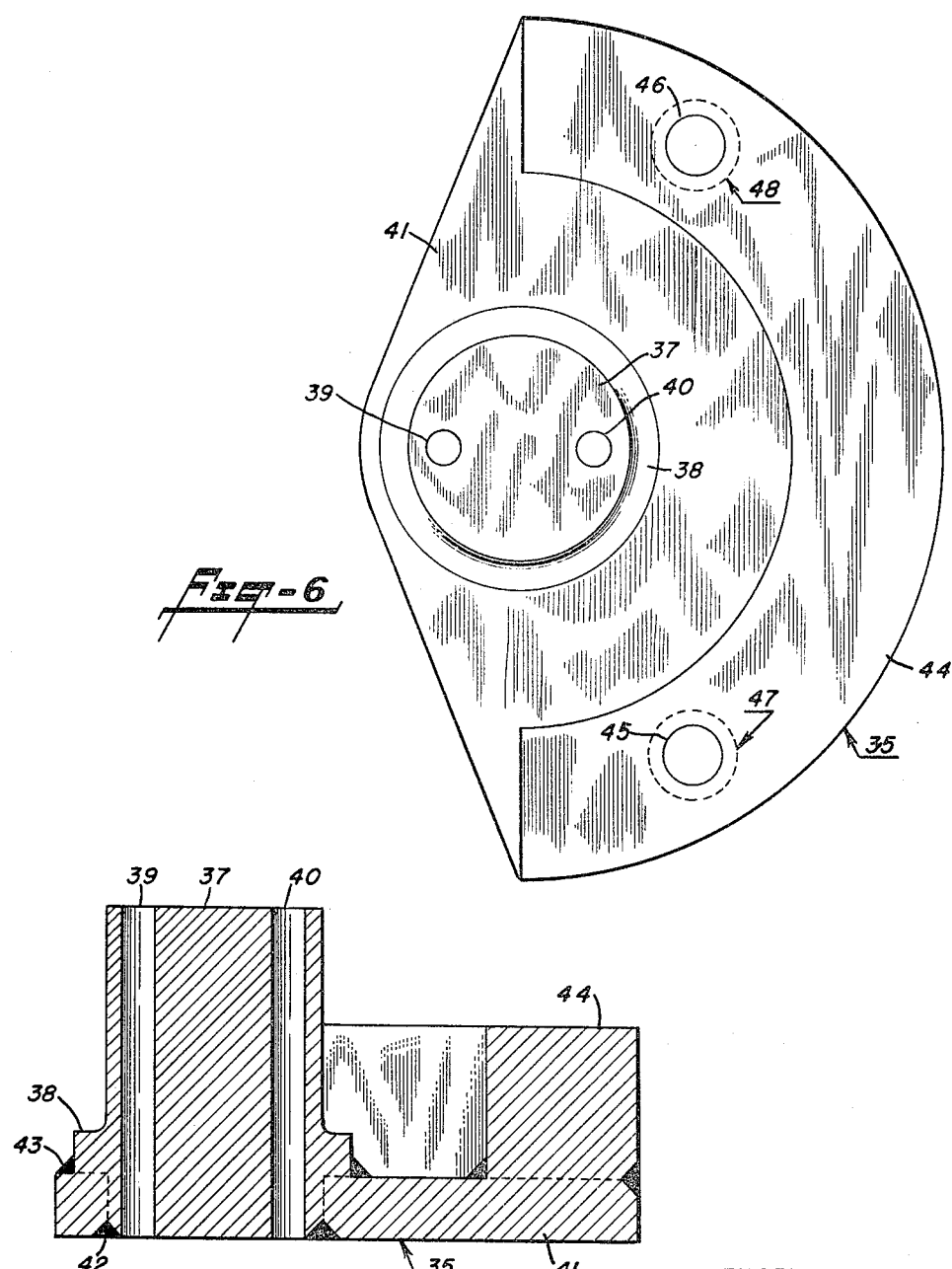

Oct. 11, 1966  E. A. WAHL  3,277,732
ELECTRO-MECHANICAL GYRATOR
Filed Dec. 11, 1964  4 Sheets-Sheet 4
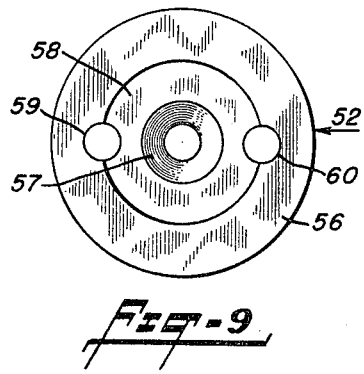
FIG-9
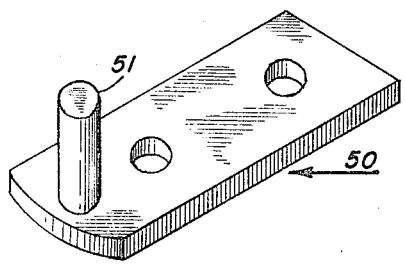
FIG-7
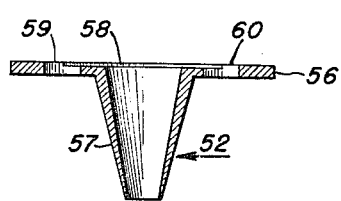
FIG-8
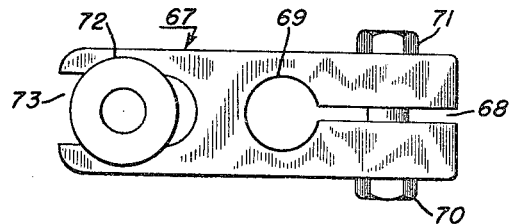
FIG-10
EUGENE A. WAHL
INVENTOR.
BY Rudolph J. Jurick
ATTORNEY

United States Patent Office 3,277,732
Patented Oct. 11, 1966

3,277,732
ELECTRO-MECHANICAL GYRATOR
Eugene A. Wahl, 294 Forest Ave., Glen Ridge, N.J.
Filed Dec. 11, 1964, Ser. No. 417,662
3 Claims. (Cl. 74—87)

This invention relates to a device for producing mechanical vibrations and more particularly to an electromechanical gyrator of novel construction and improved operation.

Gyrators of the class to which this invention is directed, are designed to be secured to a vibratorily-mounted structure for the purpose of vibrating the structure at a given frequency and amplitude. In general, such gyrators comprise one or more weights mounted eccentrically on a shaft which is rotated by an electric motor. In the case of a relatively massive structure, the dynamic forces involved are of such magnitudes as to place a heavy load on the bearings associated with the shaft carrying the weights. In consequence, bearing lubrication and heat generation are critical problems which effect the operating life of the device.

There are available electro-mechanical gyrators of various types, the most commonly used type being known as the integral motor type, that is, the electric drive motor and the rotatable, eccentric weight system are enclosed within a single housing. In the prior devices, grease is utilized as the lubricating medium. However, this presents a problem as the device must be regreased periodically at relatively short intervals, depending upon the particular load. At such times, the device often is over-lubricated or under-lubricated. In any event, even with a proper amount of lubrication, grease tends to be forced out of the path of the relatively rotating elements, thereby resulting in overheating and damage, particularly to the bearings. Also, heavily loaded bearings generate considerable localized heat and the resulting temperature gradients make it difficult to use optimum bearing fits and clearances. Thus, in the case of a grease lubricated gyrator, it is necessary to use bearings having a radial clearance of the order of 0.002", to prevent seizing due to unequal expansion of the bearing balls and races.

An electro-mechanical gyrator made in accordance with this invention utilizes circulating oil as the lubricant, which provides temperature equalization between the bearings and their housing. This permits the use of bearings having a total radial clearance of only 0.0005", which increases substantially the operating life of the device. The gyrator is so constructed as to permit the use of a standard electric motor having a desired power rating and electrical characteristics. Such motor is removably secured to a housing, or pot, carrying the eccentrically-mounted weights and associated bearings, whereby only one or the other of such major components can readily be replaced in the event it becomes inoperative.

An object of this invention is the provision of a gyrator of novel construction and particularly adapted for heavy load applications.

An object of this invention is the provision of an electro-mechanical gyrator wherein the drive motor and the eccentrically-mounted weight system are housed in separate housings which are removably secured together.

An object of this invention is the provision of an electro-mechanical gyrator wherein the shaft of the drive motor is removably coupled to an eccentric weight disposed within a housing and rotatably supported by bearings, and wherein the bearings are lubricated by circulating oil upon rotation of said weight.

An object of this invention is the provision of an electro-mechanical gyrator of the class having an eccentrically-mounted weight system supported by bearings and rotatable by an electric motor, said system being so constructed and arranged that the outer bearing race remains stationary while the inner bearing race rotates with the said system, thereby increasing the useful life of the bearing.

An object of this invention is the provision of an electro-mechanical gyrator comprising an electric motor removably secured to one side of a mounting plate, a gyrator housing secured to the other side of the mounting plate, a bearing carried by a tubular support disposed within the housing and secured to the mounting plate, an eccentric weight rotatably supported by the bearing, and means removably coupling the motor drive shaft to the weight, the assembly of the weight, bearing and tubular support being such that the thrust generated upon rotation of the weight is applied to the said mounting plate through said bearing support.

These and other objects and advantages of the invention will become apparent from the following description when taken with the accompanying drawings. It will be understood, however, that the drawings are for purposes of illustration and are not to be construed as defining the scope or limits of the invention reference being had for the latter purpose to the claims appended hereto.

In the drawings wherein like reference characters denote like parts in the several views:

FIGURE 4 is an enlarged cross-sectional view taken along the line IV–IV of FIGURE 1 and showing the internal components and their assembly in the gyrator housing;

FIGURE 5 is a vertical cross-sectional view corresponding to FIGURE 4 but showing only the bearing shaft and eccentric weight structure;

FIGURE 6 is a top plan view of the bearing shaft and eccentric weight structure;

FIGURE 7 is an isometric view of the tie bar carrying the drive pin;

FIGURE 8 is a central vertical cross-sectional view corresponding to FIGURE 4 but showing only the conical oil pump;

FIGURE 9 is a top plan view of the oil pump; and

FIGURE 10 is a top plan view of the drive coupling.

Figure 1:
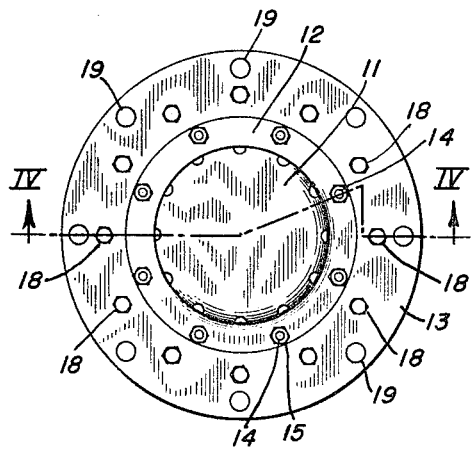
FIGURE 1 is a top plan view of an electro-mechanical gyrator made in accordance with this invention.
Figure 2:
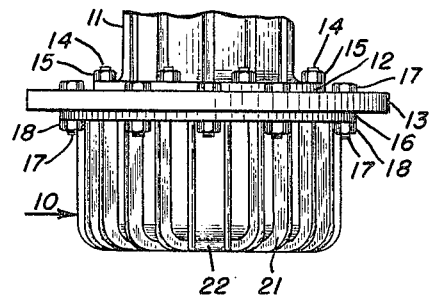
FIGURE 2 is a side elevational view thereof with a portion of the motor broken away.
Figure 3:
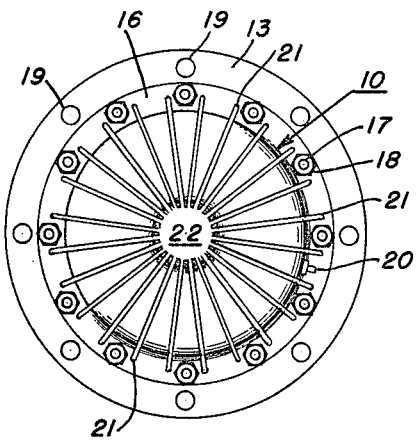
FIGURE 3 is a bottom plan view thereof.

Reference, now, is made to FIGURES 1–3 showing a housing or pot 10, which encloses the mechanical components of the gyrator, and the housing 11 of an electric drive motor. The motor is of standard design having electrical characteristics suitable for the application of the particular gyrator. The motor housing includes an integral flange 12 which is secured to a relatively thick mounting plate 13 by means of the bolts 14 and nuts 15. The housing 10 also includes an integral flange 16 which is secured to the mounting plate 13 by the bolts 17 and nuts 18. A plurality of holes 19 are formed along the peripheral edge of the mounting plate, said holes being provided to receive suitable fastening bolts by means of which the complete gyrator can be secured to a structure to be vibrated. A pipe plug 20 is threaded into a radial hole near the bottom of the housing.

The housing 10 is a light-weight aluminum casting and includes integral heat-dissipating ribs 21 which extend radially from the side wall and along the bottom, terminating in a central well portion 22. It is here pointed out that the mechanical components of the gyrator are contained within the housing 10, such components being constructed and arranged so that the dynamic thrust forces, generated upon operation of the gyrator, are applied to the heavy mounting plate 13. The housing 10 merely serves as an enclosure for the gyrator components and for the retention of a small amount of oil and, therefore, such housing can be made with a relatively thin wall, which also improves heat dissipation.

Reference now is made to FIGURE 4, which is a vertical cross-sectional view taken along the line IV—IV of FIGURE 1 but with only a portion of the motor housing shown partly in section and partly in elevation. The integral, outwardly-extending flange 16, of the housing 10, has a circular channel formed therein for receiving an O ring gasket 25, which gasket is compressed within the channel by the mounting plate 13 upon tightening of the nuts 18 on the bolts 17. The mounting plate 13 has a central hole extending therethrough and a circular bore 26 formed in the upper surface. A cylindrical bearing support 27 has an upper end extending through such central hole and this support is welded to the mounting plate, as indicated by the welds 28. The flange 12, of the motor housing 11, includes an integral circular boss 30 which extends in the mounting plate bore 26. An O ring gasket 29 is compressed between the flange 12 and a chamfer formed on the proximate corner of the mounting plate.

A pair of ball bearings 31 and 32 have outer races force-fitted into the bearing support 27 with the race of the lower bearing 32 resting upon the retaining ring 33, which ring is seated in a circular channel formed in the inner wall of the support 27. A bearing spacer ring 34 is positioned between the inner races of the two bearings. The bearing shaft and the eccentric weight is a unitary structure identified in FIGURE 4 by the numeral 35. Such structure is best shown in FIGURES 5 and 6 to which reference is now made.

In FIGURES 5 and 6, the bearing shaft comprises a solid metal cylinder 37, having an integral flange 38 and provided with two diametrically-spaced, axial holes 39 and 40. The lower end of the cylinder is force-fitted into a central hole formed in the lower plate 41 and these two members are welded together, as indicated by the welds 42 and 43. An arcuate weight 44 also is welded to the lower plate 41, such weight having an angular extent of approximately 180 degrees and having an outer surface formed on a radius corresponding to that of the lower plate. Two axial holes 45, 46 extend through the weight and are aligned with holes of a larger diameter which extend through the plate 41, the latter holes being shown in dotted lines in FIGURE 6 and identified by the numerals 47 and 48. FIGURES 5 and 6 show the structure 35 made up of three separate components, for purposes of manufacturing economy. However, such structure can be cast or machined as a single unit and is so shown in FIGURE 4.

Referring again to FIGURE 4, the metal cylinder 37, constituting the bearing shaft, is inserted through the bearings 31 and 32 so that the inner race of the lower bearing rests upon the integral flange 38, of the cylinder. In such assembly, the upper surface of the cylinder lies slightly below the upper surface of the inner race of the upper bearing 31. A tie bar 50, also shown in the isometric view of FIGURE 7, carries a drive pin 51 and is provided with two holes which are aligned with the axial holes 39 and 40 of the bearing shaft 37. Engaging the lower surface of the plate 41 is a conical oil pump 52, which will be described in detail hereinbelow, said pump having a flange portion provided with holes aligned with axial holes of the bearing shaft. A pair of bolts 53 and lock nuts 54 secure the tie bar 50 and the pump 52 to the bearing shaft, it being apparent that the two bearings are securely clamped between the tie bar and the flange 38 of the bearing shaft. Thus, upon rotation of the bearing shaft 37, the inner races of the bearings rotate while the outer races remain stationary by reason of their being force-fitted into the cylindrical bearing support 27. This arrangement reduces the ball travel by some 30%, thereby resulting in a corresponding increase in the bearing life.

The configuration of the oil pump 52 will best be understood by reference to FIGURES 8 and 9, FIGURE 8 being a central, vertical cross-sectional view corresponding to that of FIGURE 4 and FIGURE 9 being a top plan view. The oil pump is a unitary metal member comprising a base flange 56 joined to a tapered, conical portion 57 which terminates in a fine edge at the truncated apex. The top surface of the flange is counterbored to form the bore 58, which bore is intersected by the two mounting holes 59 and 60.

With the oil pump secured in position, as shown in FIGURE 4, the truncated apex extends into a pool of oil 61 carried by the housing 10. The level of the oil is below the bearing shaft and the depth of the oil, taken within the oil sump 22, is approximately ½ inch, the pipe plug 20 being located to prevent filling of the housing 10 above such depth. Upon rotation of the bearing shaft 37, oil ascends inside the cone 57 and into the bore 58 formed in the flange 56. Such bore forms an impeller chamber wherein the oil is spun centrifugally, thereby becoming pressurized sufficiently to rise through the clearance areas formed between the bolts 53 and the walls defining the holes 39 and 40. It is here pointed out that the tie bar 50 has a width substantially less than the outside diameter of the cylinder 37 and that the upper surface of this cylinder is spaced from the lower surface of the tie bar. Consequently, the oil emerges from the clearance areas of the holes 39 and 40 and flows into the space between the tie bar and to the top surface of the cylinder. From here, the oil is thrown outwardly by centrifugal force, accumulates on the cylindrical bearing support 27 and finally descends through both bearings. After passing through the bearings, the oil is thrown against the wall of the housing 10 and returns to the oil sump.

With continued reference to FIGURE 4, there are shown an upper plate 62 and two intermediate plates 63 and 64 carried by the eccentric weight 44. Each of these plates has an arcuate shape and length corresponding to that of the weight 44 and such plates constitute additional weights for increasing the thrust of the gyrator. The intermediate plates 63 and 64 are provided with two clearance holes for fastening bolts, whereas the upper plate 62 is provided with aligned, tapped holes. The fastening bolts have heads disposed within the enlarged diameter holes formed in the bottom surface of the weight 44 (see holes 47 and 48 in FIGURE 6) and ends threaded into the tapped holes of the upper plate 62, one such fastening bolt 65 being shown in dotted lines in FIGURE 4. Thus, the plate 62 serves as a clamping plate to hold the other plates 63 and 64 in place. Accordingly, the thrust of the gyrator can be decreased by omitting the plates 63 and 64 and a minimum thrust will be provided when the plate 62 and fastening bolts also are omitted.

In the unit shown approximately to scale in FIGURE 4, wherein the housing 10 has an outside diameter of 12 inches and a height of 6 inches, the illustrated pile-up of eccentric weights develops a thrust of 8,000 pounds. The heavy eccentric loading is carried by two oversize bearings and the developed thrust is applied to the heavy mounting plate 13 through the cylindrical bearing support 27. The housing 10 merely serves as a closure for the gyrator components and as an oil container, whereby the housing can be a light-weight aluminum casting which provides for a maximum dissipation of heat generated within the housing. Further, the slight pressure imparted to the oil by the oil pump is sufficient to maintain a continuous flow of oil through the bearings when the gyrator is in operation. This serves to equalize the temperature between the bearings and their supports which is an important consideration, particularly in applications wherein the bearings are heavily loaded. The described arrangement adequately lubricates the bearings and permits the use of optimum bearing fits, which is conducive to longer operating life. Specifically, in the described construction, the bearings have a total radial clearance of only 0.0005 inch whereas grease-lubricated bearings, in a comparable application, require a clearance of 0.002 inch.

The motor drive shaft 66 extends into the cylindrical bearing support 27 and is removably coupled to the eccentric weight system by means of a drive coupling 67. Such drive coupling, shown in the plan view of FIGURE 10, comprises a sturdy metal bar having a longitudinal slot 68 formed therein, which slot terminates in a central hole 69 for receiving the motor drive shaft. A bolt 70 and nut 71 serve as means for securing the drive coupling to the motor shaft. A double-headed nylon bushing 72 is slidably disposed within another slot 73 formed in the other end of the bar.

Referring back to FIGURE 4, the drive pin 51, extending from the tie bar 50, is snugly received in the central hole of the nylon bushing 72. Thus, rotation of the drive coupling 67, which is securely attached to the motor drive shaft 66, results in a corresponding rotation of the cylindrical bearing shaft 37, the eccentric weights, the oil pump and the inner races of the two bearings. Inasmuch as the drive pin 51 is diametrically opposite to the center of the eccentric weights, no part of the thrust force, generated upon rotation of the weights, can be transmitted to the motor shaft; the nylon bushing merely sliding within the slot of the drive coupling in response to any radial forces applied thereto. Since the motor housing and the drive shaft move as a unit in response to the developed thrust forces, the motor bearings can be of conventional size.

Having now described the invention, those skilled in this art will be able to make various changes and modifications in the illustrated construction and arrangement of the parts, without thereby departing from the spirit and scope of the invention as recited in the following claims.

I claim:
1. An electro-mechanical gyrator comprising,
   (a) a mounting plate having a central hole formed therein,
   (b) a cylindrical bearing support having an upper end extending through the said hole and rigidly secured to said mounting plate,
   (c) a retainer ring disposed within a circular groove formed in the inner wall of said bearing support at the lower end thereof,
   (d) a pair of ball bearings having outer races force-fitted within the said bearing support with the lower bearing race engaging the said retainer ring,
   (e) a unitary structure comprising a weight spaced from the outer wall of said bearing support, a transverse portion spaced from the lower end of the bearing support, and a cylindrical bearing shaft extending axially into said bearing support, said bearing shaft having an upper end surface recessed from the proximate surface of the inner race of the upper bearing and having a circular flange abutting the lower surface of the inner race of the lower bearing,
   (f) a pair of diametrically-opposed, axial holes formed through the bearing shaft,
   (g) a tie bar engaging the upper race of the upper bearing and spanning the said bearing shaft, at least the central portion of the tie bar having a width less than the outside diameter of the bearing shaft,
   (h) a housing secured to said mounting plate and carrying lubricating oil the surface of which is spaced from the said unitary structure,
   (i) an oil pump comprising a conical portion having a truncated apex extending into the oil and a base portion abutting the said bearing shaft, said base portion having a counterbore which is intersected by holes aligned with the holes extending through the said bearing shaft,
   (j) a pair of fastening bolts passing through the aligned holes formed in the base portion of the oil pump, the axial holes formed in the bearing shaft and aligned holes formed in the said tie bar, said bolts having diameters significantly less than the diameters of the said axial holes formed in the bearing shaft,
   (k) nuts threaded on said bolts thereby securing the oil pump to the bearing shaft and clamping the inner races of the ball bearings between the tie bar and the said flange of the bearing shaft,
   (l) an electric motor having a housing secured to the mounting plate and a drive shaft spaced from and axially aligned with the bearing shaft, and
   (m) coupling means coupling the motor drive shaft to the bearing shaft.

2. The invention as recited in claim 1, wherein the said coupling means comprising a transverse bar secured to the said drive shaft and having a longitudinal slot formed in one end, a bushing carried by said transverse bar and slidable in the said slot, and a drive pin secured to the said tie bar and extending into the said bushing.

3. The invention as recited in claim 2, wherein the said weight is arcuate and has a length of approximately 180 degrees and wherein the said drive pin lies in a vertical plane bisecting the said weight and wherein said drive pin and weight are disposed on opposite sides of the bearing shaft axis.

References Cited by the Examiner

UNITED STATES PATENTS

| | | | |
|---|---|---|---|
| 1,104,870 | 7/1914 | Brantingham | 74—87 X |
| 1,354,319 | 9/1920 | Lowe. | |
| 2,540,517 | 2/1951 | Glasco | 209—366.5 X |
| 2,599,496 | 6/1952 | Soldan | 74—87 |
| 2,655,416 | 10/1953 | Annen | 308—187 X |
| 3,079,050 | 2/1963 | Wahl. | |

FOREIGN PATENTS

| | | |
|---|---|---|
| 180,718 | 1/1955 | Austria. |
| 1,300,354 | 6/1962 | France. |
| 574,410 | 1/1946 | Great Britain. |

FRED C. MATTERN, JR., *Primary Examiner.*

BROUGHTON G. DURHAM, *Examiner.*

D. H. THIEL, *Assistant Examiner.*